Patented May 26, 1931

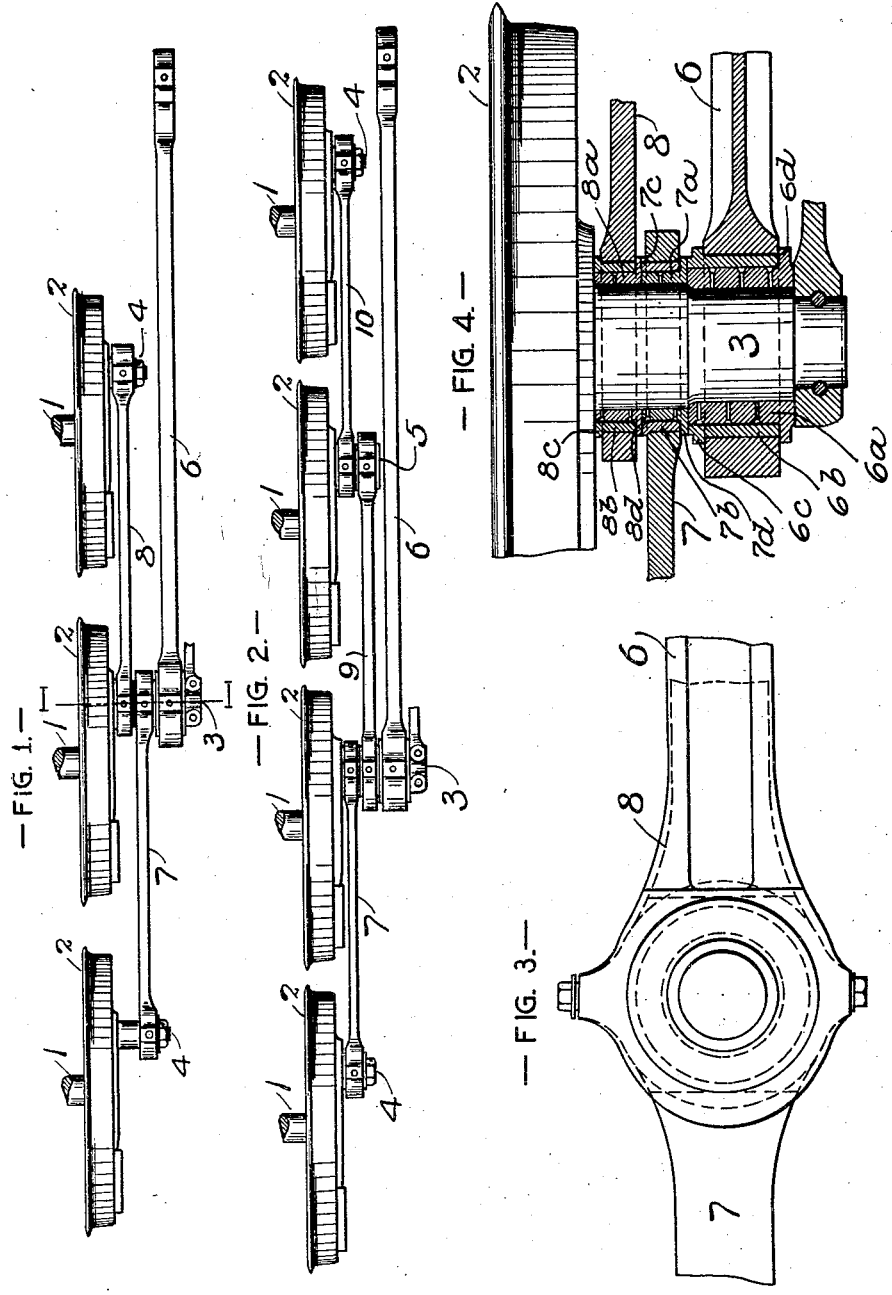

1,807,217

UNITED STATES PATENT OFFICE

WILLIAM G. KNIGHT, OF DERBY, MAINE

LOCOMOTIVE DRIVING ROD CONNECTION

Application filed May 18, 1929. Serial No. 364,138.

This invention relates generally to the rod mechanism of locomotives, and more particularly to the coupling rods of adjacent wheels. The object of the invention is to provide a means for transmitting operative power to three or more pairs of coupled driving wheels of a locomotive from such a source as the pistons of a locomotive engine, or the motor driven crank of an electric locomotive, by the use of a system of rod connections which shall be of a more simple construction than heretofore employed, wherein knuckle pin joints are eliminated in the coupling rods, thereby greatly reducing the cost of rod maintenance. A further object is to reduce the variation between coupling rod pin centers when one wheel drops slightly out of line with adjacent wheels, as in the case of low rail joints. In this invention the side rods have the same length between pin centers as the distance between the driving wheel axles themselves, and are less affected by vertical displacements of the wheels than rods with knuckle joints, which are necessarily shorter due to the overhang of the joint. This difference of length also affects the amount of lateral displacement possible; the longer rod of this design causing a smaller angle to be formed between the rod and its pins when hub wear occurs. Coupling rods of previous designs, omitting knuckle joints, have been complicated and heavy due to their being coupled to a bushing or hub on the connecting rod. The present design is simpler and lighter in that it couples directly to the crank pin itself.

The improvement claimed is hereinafter fully set forth.

In the accompanying drawings: Figure 1, is a plan view of three driving wheels coupled with the associated rods; Fig. 2, is a plan view of four driving wheels of a locomotive coupled with the associated rods; Fig. 3, is a side view in elevation on an enlarged scale of the main pin and a portion of the rods fitted thereon; and, Fig. 4, is a horizontal section on an enlarged scale on the line I—I of Fig. 1.

In the practice of the invention, referring descriptively to the specific embodiment herein exemplified, and more particularly to Fig. 1, the driving axles, 1, a portion only of which is shown in the drawings, have mounted upon them the wheels 2, in one of which is mounted the main crank pin 3, and in the others, the coupling rod pins 4—4. Mounted on the main crank pin 3, is the main connecting rod 6, transmitting power from a source not shown, but which may be the piston of a steam engine, or the crank of an electric motor. Also mounted on the pin 3, are the coupling rods 7, 8, extending oppositely therefrom and adapted to be coupled at their outer ends to the crank pins 4—4 mounted in the adjacent wheels.

The main connecting rod and the coupling rods are each provided with an independent pair of interfitting concentric bushings which mount the respective rods on the main crank pin. The interfitting bushings for the coupling rod 8, comprise an inner floating bushing 8a and an outer press fitted bushing 8b. The outer bushing is formed with an outwardly directed flange 8c, at one end only, and is press fitted into the cylindrical main crank pin bore in the rod 8, the flange 8c, bearing against the inner face of the rod. The inner floating bushing 8a is formed with an outwardly directed flange 8d at one end only. This bushing is inserted in the crank pin bore in the rod 8, from the outer end of that bore, and the flange 8d overlaps the outer end of the bushing 8b and the portion of the outer face of the rod 8 surrounding the main crank pin bore.

The interfitting bushings for the coupling rod 7 comprise an inner floating bushing 7a, and an outer press fitted bushing 7b. The outer bushing is formed with an outwardly directed flange 7c, at one end only, and is press fitted into the main crank pin bore in the rod 7, the flange 7c, bearing against the inner face of the rod. The inner floating bushing 7a, is formed with an outwardly directed flange 7d, at one end only. This bushing is inserted in the crank pin bore in the rod 7 from the outer end of that bore, and the flange 7d overlaps the outer end of the bushing 7b and the portion of the outer face of the rod 7 surrounding the main crank pin bore.

The interfitting bushings for the main connecting rod 6, comprise an inner floating bushing 6a and an outer press fitted bushing 6b. The outer bushing 6b is formed with an outwardly directed flange 6c, at one end only, and is press fitted into the main crank pin bore in the rod 6, the flange 6c, bearing against the inner face of the rod. The inner floating bushing 6a, is formed with an outwardly directed flange 6d, at one end only. This bushing is inserted in the crank pin bore in the rod 6, from the outer end of that bore, and the flange 6d overlaps the outer end of the bushing 6b and the portion of the outer face of the rod 6 surrounding the main crank pin bore.

As shown in Fig. 2, when four wheels are to be coupled, the intermediate crank pin 5, is mounted in one of the adjacent wheels, and has fitted thereto one of the coupling rods 9, also fitted to the main pin 3. To drive the outermost wheel 2, the coupling rod 10 is fitted to the crank pin 5, and to the crank pin 4, in said outermost wheel.

It will be noted that the several coupling and connecting rods are fitted to the crank pins all independently of each other, whereby the knuckle pins and jaws usually employed to connect adjacent rods are done away with.

The improvement claimed and desired to be secured by Letters Patent is:

1. In a locomotive engine having a plurality of driving axles, the combination of a main crank pin; a main connecting rod coupled thereto; coupling rods fitted on the main pin, independently of the main connecting rod, and concentric with said main crank pin; and a separate floating bushing for each of the rods mounted directly upon the main crank pin.

2. In a locomotive engine having a plurality of driving axles with wheels mounted thereon, the combination of a main crank pin; a main connecting rod coupled thereto; coupling rods, fitted to the main pin and concentric therewith, disposed between the main connecting rod and the wheel; and a separate floating bushing for each of the rods mounted directly upon the main crank pin.

3. In a locomotive engine having a plurality of driving axles with wheels mounted thereon, the combination of a main crank pin; a main connecting rod coupled thereto; oppositely extending coupling rods, fitted concentrically on the main crank pin, and disposed between the main connecting rod and the wheel; and a separate floating bushing for each of the rods mounted directly upon the main crank pin.

4. In a locomotive engine having a plurality of driving axles with wheels mounted thereon, the combination of a main crank pin in one of the wheels; a main connecting rod coupled to said main crank pin; oppositely extending coupling rods, fitted concentrically on said main crank pin independently of the main connecting rod, and each other; and a separate floating bushing for each of the rods mounted directly upon the main crank pin.

5. In a locomotive engine having a plurality of driving axles with wheels mounted thereon, the combination of a main crank pin mounted in one of the wheels; a main connecting rod coupled thereto; oppositely extending coupling rods, fitted concentrically on said main crank pin, independently of said main connecting rod, and each other, disposed between the main connecting rod and the wheel; a separate floating bushing for each of the rods mounted directly upon the main crank pin; and crank pins in adjacent wheels, connected to the other ends of the oppositely extending coupling rods.

6. In a locomotive engine having a plurality of driving axles and wheels mounted thereon, the combination of a main crank pin mounted in one of the wheels; a main connecting rod coupled thereto; oppositely extending coupling rods, fitted concentrically on the main crank pin, between said main connecting rod and the wheel, and fitted to crank pins mounted in adjacent wheels; a separate floating bushing for each of the rods mounted directly upon the main crank pin; and a coupling rod fitted to the crank pin mounted in an adjacent wheel, independently of the coupling rod fitted to the main crank pin, and fitted to a crank pin mounted in another adjacent wheel.

7. In a locomotive, the combination of three driving wheels disposed in the same vertical plane, the intermediate driving wheel having a main crank pin and the two outer driving wheels each having a crank pin; a main connecting rod having a solid unbifurcated end formed with a cylindrical bore in which the main crank pin is fitted; and two oppositely extending rigid coupling rods, each formed with a cylindrical bore at one end in which the main crank pin is fitted, and at the other end with a cylindrical bore in which the crank pin of one of the outer wheels is fitted, the said coupling rods being fitted on said main crank pin independently of said main connecting rod.

8. In a locomotive, the combination of three driving wheels disposed in the same vertical plane, the intermediate driving wheel having a main crank pin and the two outer driving wheels each having a crank pin; a main connecting rod having a solid unbifurcated end formed with a cylindrical bore in which the main crank pin is fitted; two oppositely extending rigid coupling rods each formed with a cylindrical bore at one end in which the main crank pin is fitted and at the other end with a cylindrical bore in which the crank pin of one of the outer wheels is fitted, the said coupling rods being disposed inwardly of the main connecting rod; and a separate pair of concentrically interfitted bushings for each of the respective rods fitted in the main crank pin bores thereof and mounting the same on the main crank pin.

9. In a locomotive, the combination of three driving wheels disposed in the same vertical plane, the intermediate driving wheel having a main crank pin and the two outer driving wheels each having a crank pin; a main connecting rod having a solid unbifurcated end formed with a cylindrical bore in which the main crank pin is fitted; two oppositely extending rigid coupling rods each formed with a cylindrical bore at one end in which the main crank pin is fitted and at the other end with a cylindrical bore in which the crank pin of one of the outer wheels is fitted, the said coupling rods being disposed inwardly of the main connecting rod; and a separate pair of concentrically interfitted bushings for each of the respective rods fitted in the main crank pin bores thereof and mounting the same on the main crank pin, each pair of bushings comprising an outer bushing having an outwardly directed flange at one end only which bushing is press fitted into the bore of its respective rod, the flange thereof abutting the inner face of the rod, and an inner floating bushing having an outwardly directed flange at one end only, said flange overlying the unflanged end of the outer bushing and the portion of the outer face of its respective rod surrounding the crank pin bore therein.

WILLIAM G. KNIGHT.